(12) United States Patent
Douglas (10) Patent No.: US 7,686,403 B2
(45) Date of Patent: Mar. 30, 2010

(54) METHODS AND SYSTEMS FOR BALANCING SPOKED WHEELS USING WEIGHT BEHIND A SINGLE SPOKE

(75) Inventor: Michael W. Douglas, St. Charles, MO (US)

(73) Assignee: Hunter Engineering Company, Bridgeton, MO (US)

( * ) Notice: Subject to any disclaimer, the term of this patent is extended or adjusted under 35 U.S.C. 154(b) by 714 days.

(21) Appl. No.: 11/530,386

(22) Filed: Sep. 8, 2006

(65) Prior Publication Data

US 2008/0060425 A1 Mar. 13, 2008

(51) Int. Cl.
*B60B 1/00* (2006.01)

(52) U.S. Cl. ............... 301/5.21; 700/279; 73/66

(58) Field of Classification Search ............ 73/462, 73/487, 66; 301/5.21; 700/279
See application file for complete search history.

(56) References Cited

U.S. PATENT DOCUMENTS

| | | | | |
|---|---|---|---|---|
| 3,228,264 A | * | 1/1966 | Trimble | 408/2 |
| 3,589,203 A | * | 6/1971 | Hines | 474/121 |
| 3,681,967 A | * | 8/1972 | Hines et al. | 73/1.14 |
| 4,106,964 A | * | 8/1978 | DeVittorio | 156/75 |
| 4,191,055 A | * | 3/1980 | Orem et al. | 73/462 |
| 4,214,481 A | * | 7/1980 | Reutlinger | 73/462 |
| 4,357,832 A | * | 11/1982 | Blackburn et al. | 73/462 |
| 4,854,168 A | | 8/1989 | Himmler | |
| 4,890,717 A | * | 1/1990 | Kane | 198/403 |
| 4,891,981 A | | 1/1990 | Schonfeld | |
| 4,903,398 A | * | 2/1990 | Sakamoto et al. | 29/703 |
| 5,048,173 A | * | 9/1991 | Miller | 29/450 |
| 5,134,766 A | * | 8/1992 | Miller | 29/450 |
| 5,355,729 A | | 10/1994 | Douglas | |
| 5,479,821 A | * | 1/1996 | Goebel | 73/457 |
| 5,591,909 A | * | 1/1997 | Rothamel et al. | 73/462 |
| 5,689,069 A | | 11/1997 | Corghi | |
| 5,915,274 A | * | 6/1999 | Douglas | 73/462 |
| 5,959,204 A | * | 9/1999 | Rothamel et al. | 73/462 |
| 5,979,237 A | * | 11/1999 | Spaggiari | 73/462 |
| 6,079,268 A | * | 6/2000 | Metzner | 73/462 |
| 6,484,574 B1 | * | 11/2002 | Douglas et al. | 73/462 |
| 6,772,626 B1 | * | 8/2004 | Engel et al. | 73/146 |
| 6,952,964 B2 | | 10/2005 | Gerdes et al. | |
| 7,191,650 B2 | * | 3/2007 | Cunningham et al. | 73/462 |
| 7,191,651 B2 | * | 3/2007 | Douglas et al. | 73/462 |
| 7,221,441 B2 | * | 5/2007 | Douglas et al. | 356/139.09 |
| 7,320,248 B2 | | 1/2008 | Douglas | |
| 7,594,436 B2 | | 9/2009 | Gerdes et al. | |
| 2005/0052658 A1 | | 3/2005 | Braghiroli | |
| 2006/0005623 A1 | * | 1/2006 | Hildebrand et al. | 73/468 |
| 2006/0096373 A1 | * | 5/2006 | Rogalla et al. | 73/487 |

FOREIGN PATENT DOCUMENTS

| DE | 19526101 A1 | * | 1/1997 |
|---|---|---|---|
| IT | 01319713 | | 11/2003 |
| JP | 2002122501 A | * | 4/2002 |

* cited by examiner

*Primary Examiner*—Hezron Williams
*Assistant Examiner*—Samir M Shah
(74) *Attorney, Agent, or Firm*—Armstrong Teasdale LLP (57) ABSTRACT

Methods and systems for reducing imbalance in a wheel assembly are provided. The method includes determining an imbalance characteristic associated with a first plane, determining an imbalance characteristic associated with a second plane, and translating a component of the imbalance characteristic from the first plane to the second plane.

28 Claims, 9 Drawing Sheets

METHODS AND SYSTEMS FOR BALANCING SPOKED WHEELS USING WEIGHT BEHIND A SINGLE SPOKE

BACKGROUND OF THE INVENTION

This invention relates generally to balancing automotive vehicle wheels and more particularly, to methods and systems for balancing automotive vehicle wheels with rims that are constructed with radially extending, spaced apart spokes.

Many automotive wheel balancer manufacturers offer a feature which balances spoked wheels where an imaginary vertical "plane" perpendicular to the wheel axis of rotation and located directly behind the spokes of the wheel is selected for application of balance correction weights. Spoke locations are made known to the balancer by user manual input or via optical methods as described by US2005/0052658 to Braghiroli. After the wheel imbalance is measured and the required angular placement is known for the required correction weight at the spoke plane, vector equivalent weights are resolved and displayed for placement behind two spokes. This feature is typically referred to as a "split" function.

U.S. Pat. No. 5,355,729 to Douglas describes a generic "split weight" function using incremental weights for the split with variable placement angle, U.S. Pat. No. 5,591,909 to Hofmann describes fixed placement angles for the split (two spokes) and variable weight magnitudes (rounded to increments), and U.S. Pat. No. 4,357,832 to Blackburn describes a turbine blade balancing procedure where fixed placement angles are provided (the blades) and variable weight removal from the blades accomplishes the "split" balance of the rotor. For automatic wheel balancing, spoke plane "split" functions are predominately applied during a "two plane (inner and outer) dynamic balance" mode where two weights simultaneously correct for both static imbalance (shake force due to radial off-center of mass) and couple imbalance (twist forces caused only during rotation). The inner plane weight can be a clip-on style, adhesive style, or even a balance patch on the inside periphery of the tire. Static single plane balance mode is also sometimes used, but for that case the single plane weight can be a clip-on style on the inside rim lip, an adhesive style near the center of the rim where it is too far behind spokes to make any "split" function effective (one would still see the split weights when not viewing the wheel exactly straight on), or a patch style inside the tire (which is not applicable to rim spokes).

Although the automotive wheel "split" function provides a way to hide weights on spoked wheels from view, it causes extra labor for the operator and increases the chance of weight placement error because two weights must be applied to the weight plane located behind the spokes. Three weights in total are added to the wheel instead of the usual two weights. Italian Patent No. IT1319713 to Buzzi addresses these problems by recognizing that the desired placement angle for the "unsplit" weight on the spoke plane is seldom located exactly between spokes. Analysis of placing a weight only at the spoke nearest the un-split vector reveals that the residual imbalance error caused on the "spoke plane" by applying weight at only one spoke can be less than a predetermined imbalance limit for the spoke plane, enabling the possibility to balance a spoked wheel using only one spoke weight placement instead of two. But there are limitations with this method.

The computations for the single spoke weight magnitude and the "residual error" after applying this weight are only performed at the spoke plane, limiting how often the single spoke method can be used. Italian Patent No. IT1319713 to Buzzi acknowledges that when the un-split location is not near enough to a spoke, it is necessary to revert back to a "conventional" split method where weights behind two spokes are employed. For cases when the method can be used, the residual imbalance has a static component which could stack up with other residual static imbalances due to user weight placement error and wheel centering error. The importance of minimizing static imbalance is well documented in for example, U.S. Pat. No. 4,854,168 to Hofmann, U.S. Pat. No. 4,891,981 to Schenck, U.S. Pat. No. 5,915,274 to Douglas, and U.S. Pat. No. 5,689,069 to Corghi. A method of minimizing static imbalance is needed for all instances of wheel assembly balancing without causing any residual static imbalance and without restricting the method to being used only for certain imbalance conditions and spoke arrangements.

BRIEF DESCRIPTION OF THE INVENTION

In one embodiment, a method for reducing imbalance in a wheel assembly includes determining an imbalance characteristic associated with a first plane, determining an imbalance characteristic associated with a second plane, and translating a component of the imbalance characteristic from the first plane to the second plane.

In another embodiment, a method of reducing imbalance in a wheel assembly includes measuring imbalance characteristics in the wheel assembly, combining a couple imbalance characteristic with the measured imbalance characteristics to determine a combined imbalance characteristic, and determining a first correction weight location in a first plane to offset a first portion of the combined imbalance characteristic acting in the first plane wherein said first correction weight location is related to a spoke location.

In yet another embodiment, a method of balancing a rotatable wheel assembly includes translating an imbalance characteristic from a first plane to a second plane.

In still another embodiment, a method of reducing imbalance in a wheel assembly is provided. The wheel assembly includes a first and a second balancing plane and a plurality of radially extending, circumferentially spaced apart spokes that each define a preferential balance weight placement zone. The method includes determining at least a first and second vector component of an imbalance characteristic in the first balancing plane, determining a first balance weight value at an angular position in the first plane wherein the angular position corresponds to one of the plurality of preferential balance weight placement zones, said first balance weight value and angular position determined to counter the first vector component of the imbalance characteristic, translating the second vector component of the imbalance characteristic to the second plane, and vectorally combining the second vector component of the imbalance characteristic with the determined imbalance component acting on the second plane.

In still yet another embodiment, a method of reducing imbalance in a wheel assembly includes determining imbalance characteristics acting on at least one of a first and a second balancing plane, and combining a couple imbalance characteristic with the determined imbalance characteristics such that the combined imbalance characteristics acting on the first plane are less than a predetermined threshold.

In another embodiment, a wheel balancer system includes a rotatable wheel assembly mount, a plurality of imbalance sensors coupled to said mount, said sensors configured to measure an imbalance characteristic associated with the wheel assembly, and a processor communicatively coupled to said sensors, said processor configured to determine imbalance characteristics acting on a first plane, determine imbalance characteristics acting on a second plane, determine a first correction weight and a first location in the first plane to place the first weight to offset at least a portion of the imbalance characteristics acting on the first plane such that a residual imbalance characteristic remains on that plane, translate the residual imbalance characteristic to the second plane, and combine the residual imbalance characteristic and the imbalance characteristics acting on the second plane.

DETAILED DESCRIPTION OF THE INVENTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

As used herein "vector" represents magnitudes and angles of correction forces to be applied at correction weight planes for balancing the wheel. Vectors may also represent correction weights to be applied to the wheel at the same angles indicated by the vectors. The vector can thus be interchangeably worded as a "correction vector," "correction weight" vector, or simply "vector." Note that in all of the figures the final vectors computed and displayed to the operator are shown as bold.

Figure 1A:
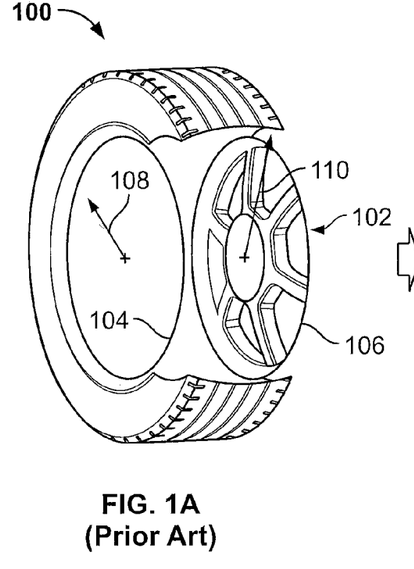
FIGS. 1A and 1B are vector diagrams of a spoke wheel assembly having an imbalance condition that is corrected using two spokes using a known split weight method.
Figure 1B:
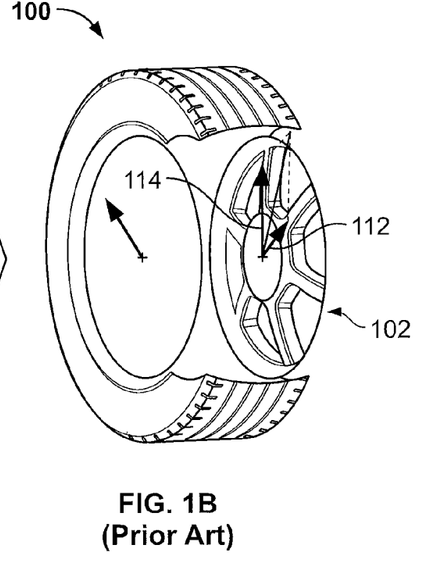

FIGS. 1A and 1B are vector diagrams of a spoke wheel assembly 100 having an imbalance condition that is corrected using two spokes with a known split weight method. In the exemplary embodiment, spoke wheel assembly 100 includes a rim 102 having an associated inner correction weight plane 104 and outer correction weight plane 106. In alternative embodiments, outer correction weight plane 106 may include other numbers of spokes than six. Spoke wheel assembly 100 is shown in a two-plane dynamic imbalance condition which is determined to require imbalance correction forces represented by inner plane vector 108 and outer plane vector 110. FIG. 1B illustrates a prior art "split" function solution wherein outer plane vector 110 is resolved into two distinct component vectors 112 and 114 in order to hide the correction weights behind spokes.

Figure 2A:
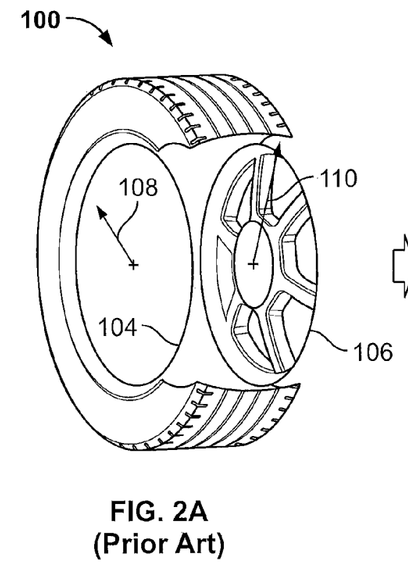
FIGS. 2A and 2B are vector diagrams of the spoke wheel assembly having the identical imbalance condition as shown in FIGS. 1A and 1B, corrected using another known method.
Figure 2B:
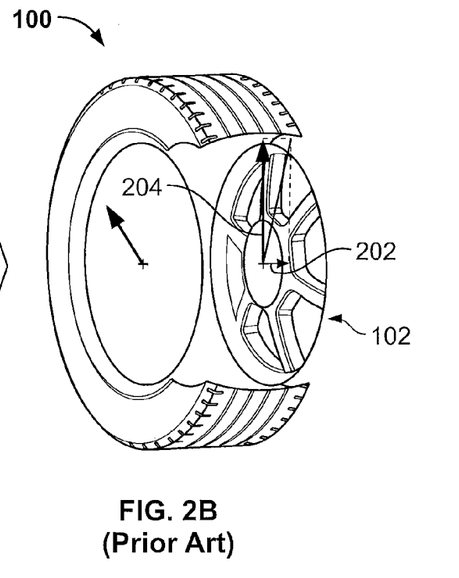

FIGS. 2A and 2B are vector diagrams of spoke wheel assembly 100 having the identical imbalance condition as shown in FIGS. 1A and 1B that is corrected using the prior art method described in Italian Patent IT1319713. The spoke nearest to vector 110 is selected for placing correction weight. The vector 204 at a spoke is modified with respect to vector 110 in order to produce a minimal residual error vector 202. After the user applies the correction weights corresponding to correction force vector 108 on inner correction weight plane 104 and the correction force vector 204 on outer correction weight plane 106 behind the selected spoke, a residual imbalance comprising a residual static component vector 202 remains in spoke wheel assembly 100. Vector 202 also induces a residual couple component because vector 202 is applied off of the center of mass of spoke wheel assembly 100. If the length (magnitude) of error 202 is above a predetermined threshold, Italian Patent IT1319713 then determines that a traditional two spoke split method, as is shown in FIGS. 1A and 1B, is used instead because the imbalance correction vector is not close enough to a spoke to enable the feature to succeed.

Figure 3A:
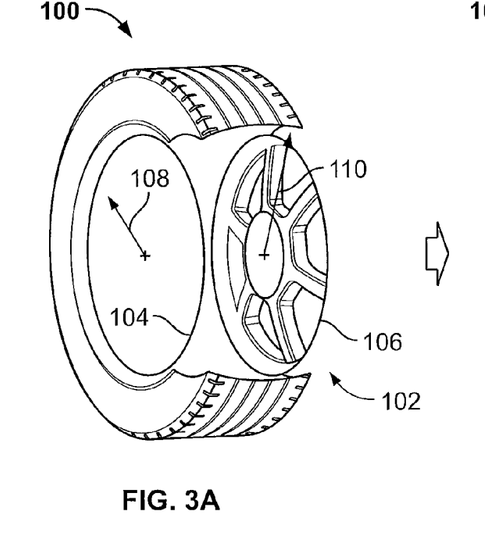
FIGS. 3A through 3E are vector diagrams of the spoke wheel assembly having the identical imbalance condition as shown in FIGS. 1A and 1B, corrected in accordance with an embodiment of the present invention.
Figure 3B:
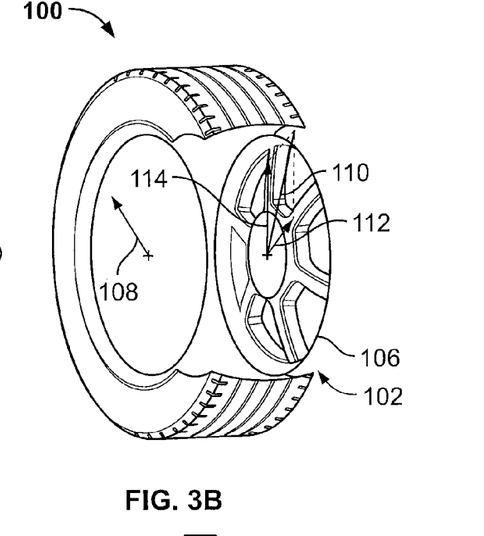
Figure 3C:
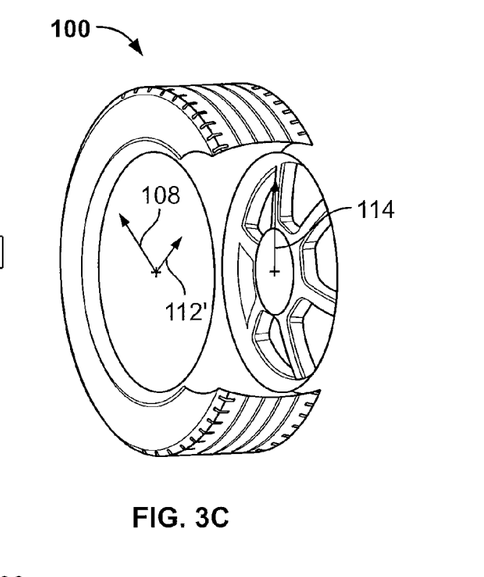
Figure 3D:
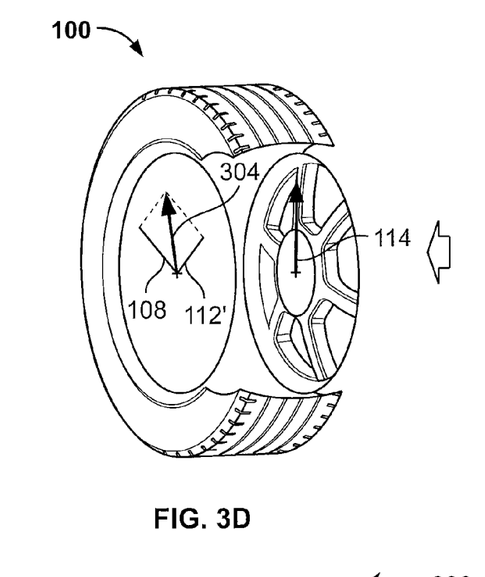
Figure 3E:
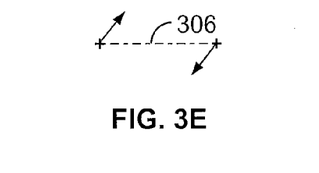

FIGS. 3A through 3E are vector diagrams of spoke wheel assembly 100 having the identical imbalance condition as shown in FIGS. 1A and 1B. FIGS. 3A through 3D shows how the present invention achieves single spoke usage without causing residual static error and without the restriction of the outer plane vector residing near a spoke. FIG. 3A illustrates the identical imbalance shown in FIG. 1A. FIG. 3B illustrates that an outer plane vector 110 is resolved into two distinct component vectors 112 and 114 computed at outer correction weight plane 106. FIG. 3C illustrates that component vector 114 is then selected to remain in outer correction weight plane 106 and component vector 112 is laterally translated to inner correction weight plane 104 as a translated vector 112'. FIG. 3D illustrates that translated vector 112' is vectorally combined with vector 108 to form a final inner plane correction vector 304. Inner and outer weights are then displayed to the operator corresponding to vectors 304 and 114, respectively. Accordingly, both of the original outer plane correction vectors 112 and 114 are applied to the wheel (one at a spoke and the other combined with original inner plane vector 108) therefore the static residual is completely compensated for regardless of the magnitude of the outer plane imbalance vector and regardless of its angle location with respect to spoke locations. A residual couple imbalance 306, which would remain after applying correction weights is shown in FIG. 3E. The magnitude of residual couple imbalance 306 force is the magnitude of vector 112' applied at each plane with 180 degree angle separation. The wheel balancer displays to the operator a correction weight corresponding to vector 304 for inner correction weight plane 104 and weight corresponding to spoke vector 114 on outer correction weight plane 106. In the exemplary embodiment, the residual couple imbalance is determined to be below an acceptable predetermined level, and balance of wheel assembly 100 is accomplished using only a single weight hidden behind a spoke and without causing residual static imbalance and without the restriction of the initial outer plane imbalance vector residing proximate a spoke.

Figure 4A:
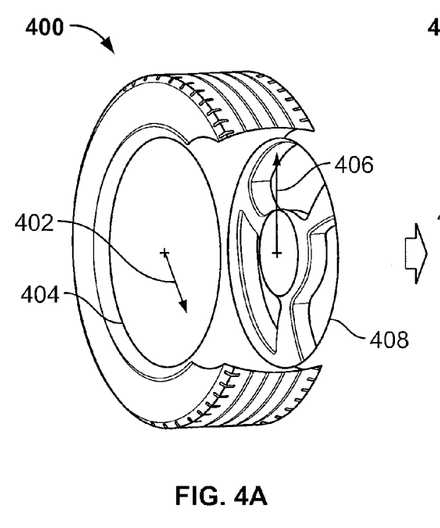
FIGS. 4A through 4E are vector diagrams of the spoke wheel assembly shown in FIG. 1A having an initial "worst case" imbalance condition and an exemplary solution in accordance with an embodiment of the present invention.
Figure 4B:
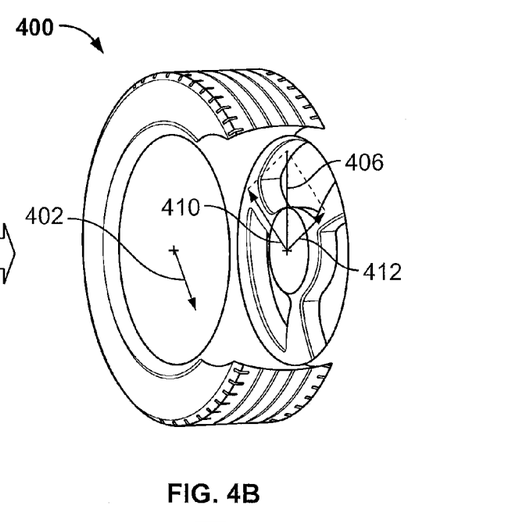
Figure 4C:
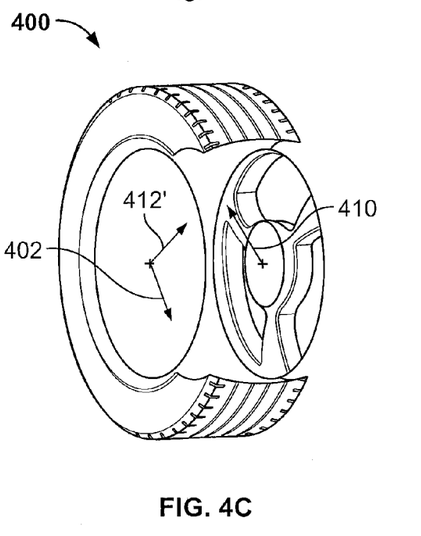
Figure 4D:
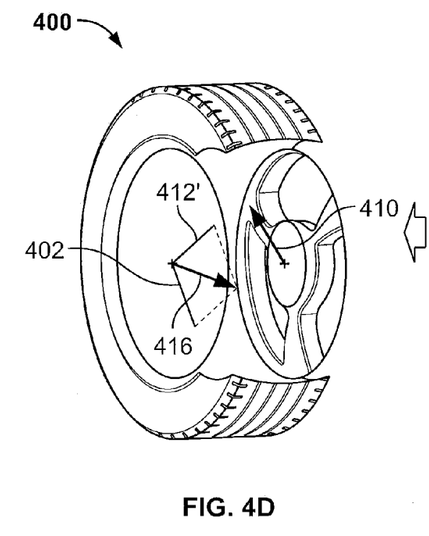
Figure 4E:
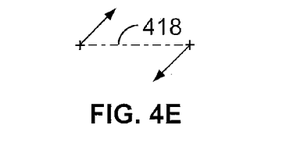

FIGS. 4A through 4E are vector diagrams of spoke wheel assembly 400 having an initial "worst case" imbalance condition and an exemplary solution in accordance with an embodiment of the present invention. In the exemplary embodiment, spoke wheel assembly 400 comprises only three spokes. FIG. 4A illustrates an inner imbalance correction vector 402 along an inner correction weight plane 404 and an outer imbalance correction vector 406 along an outer correction weight plane 408 wherein outer imbalance correction vector 406 is positioned approximately midway between two spokes of outer correction weight plane 408. Outer imbalance correction vector 406 is resolved into a spoke vector 410 and a spoke vector 412, which are each circumferentially aligned with respective spokes. One of the vectors 410 and 412 is then selected to remain on the outer plane as the single spoke weight. In the exemplary embodiment, vector 410 is selected to remain on the outer plane as the single spoke weight and vector 412 is translated to inner correction weight plane 404 as a translated vector 412' and vectorally combined with inner imbalance correction vector 402. Translated vector 412' and inner imbalance correction vector 402 are combined to form a final inner plane vector 416. Static imbalance is completely compensated for and a resulting couple imbalance 418 after applying vectors 416 and 410 is determined to be less than a predetermined acceptable couple force level. Inner and outer weights are then displayed to the operator corresponding to vectors 416 and 410, respectively, and the imbalance correction of spoke wheel assembly 400 is completed using only a single spoke weight.

Figure 5A:
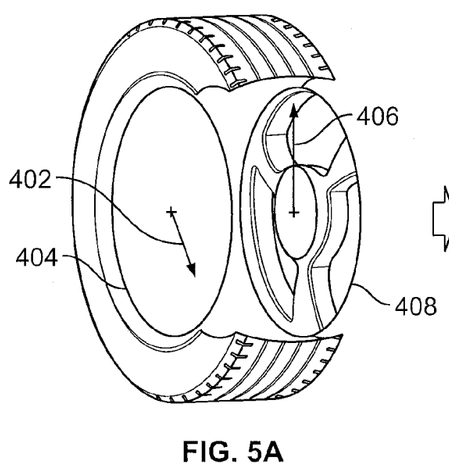
FIGS. 5A through 5E are vector diagrams of the spoke wheel assembly shown in FIG. 4A having the same initial "worst case" imbalance condition and an exemplary solution using a different spoke vector as the translated vector.
Figure 5B:
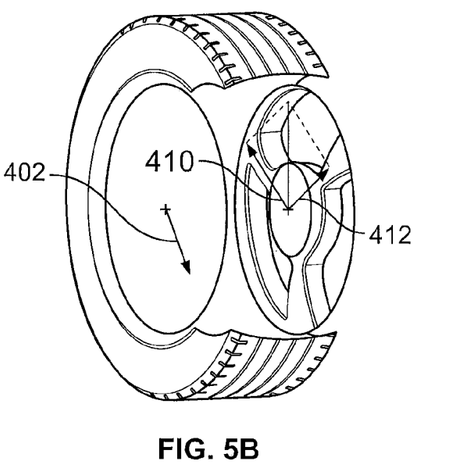
Figure 5C:
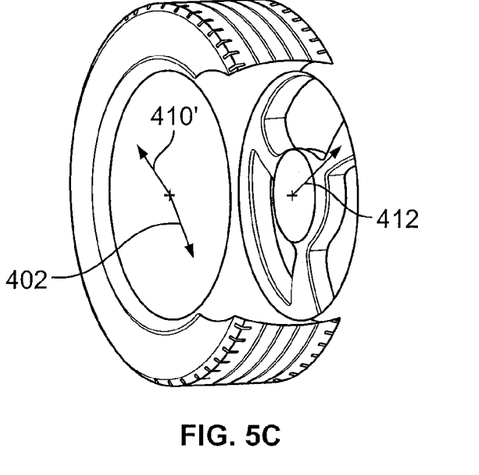
Figure 5D:
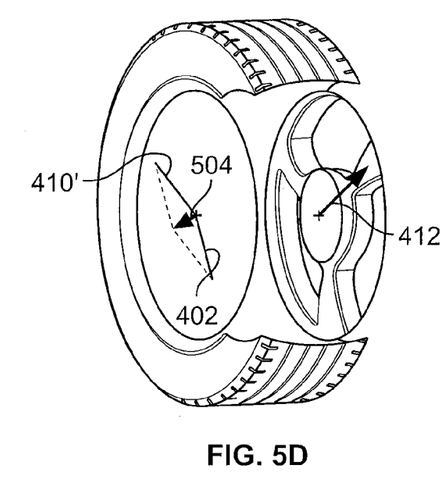
Figure 5E:
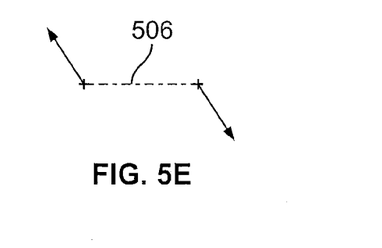

An embodiment of the present invention selects an alternate spoke to determine if using the alternate spoke would result in a reduction in correction weight usage and/or a lower residual couple amount. FIGS. 5A through 5E are vector diagrams of spoke wheel assembly 400 having the same initial "worst case" imbalance condition and an exemplary solution using spoke vector 410 as the translated vector. FIG. 5A illustrates inner imbalance correction vector 402 along inner correction weight plane 404 and outer imbalance correction vector 406 along outer correction weight plane 408 wherein outer imbalance correction vector 406 is positioned approximately midway between two spokes of outer correction weight plane 408. Outer imbalance correction vector 406 is resolved into a spoke vector 410 and a spoke vector 412, which are each circumferentially aligned with a respective spoke. In this embodiment, spoke vector 412 is selected to remain on the outer plane as the single spoke weight. Spoke vector 410 is translated to inner correction weight plane 404 as a translated vector 410' and vectorally combined with inner imbalance correction vector 402. Translated vector 410' and inner imbalance correction vector 402 are combined to form a final inner plane vector 504. Static imbalance is completely compensated for and a resulting couple imbalance 506 after applying vectors 504 and 412 is determined to be less than a predetermined acceptable couple force level. Inner and outer weights are then displayed to the operator corresponding to vectors 504 and 412, respectively, and the imbalance of spoke wheel assembly 400 is completed using only a single spoke weight. Final inner plane vector 504 is smaller in magnitude (smaller weight) compared to final inner plane vector 416 (shown in FIG. 4). Resulting couple imbalance 506 although slightly larger than resulting couple imbalance 418 (shown in FIG. 4) is determined to be less than a predetermined acceptable couple force level. Inner and outer weights are then displayed to the operator corresponding to vectors 504 and 412, respectively, and the imbalance correction of spoke wheel assembly 400 is completed using only a single spoke weight. Although in the exemplary embodiment, the spoke selected for the final spoke weight is adjacent to the "unsplit" vector, the spoke selected for the final single spoke balance weight is not restricted to be a spoke that is adjacent to the "unsplit" vector. For example, with a different initial imbalance situation having a rim with more spokes it could be possible to use a spoke outside of the two spokes which straddle the unsplit vector if using such a spoke would enable less residual couple imbalance and/or less total weight usage.

Figure 6A:
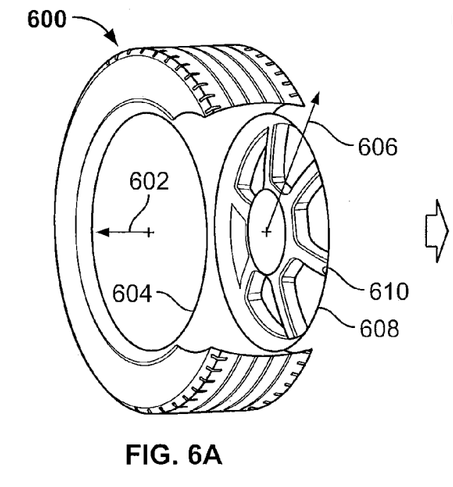
FIGS. 6A through 6F are vector diagrams of a spoke wheel assembly having an initial imbalance condition wherein the computed weight amount corresponding to the selected wheel spoke would be physically wider in width than the spoke itself and an exemplary solution.
Figure 6B:
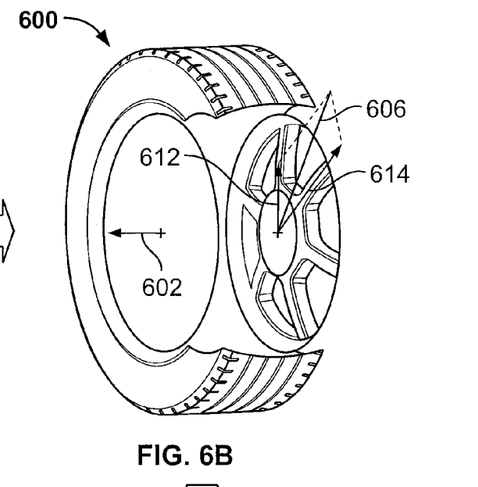
Figure 6C:
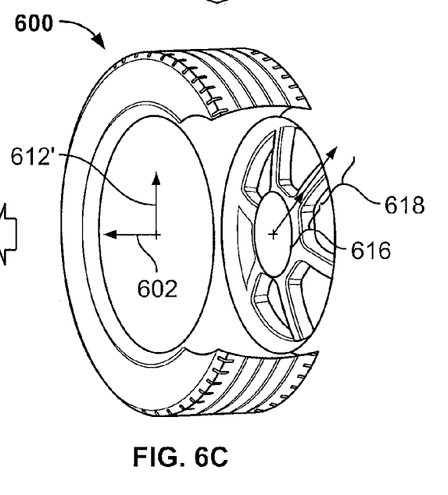
Figure 6D:
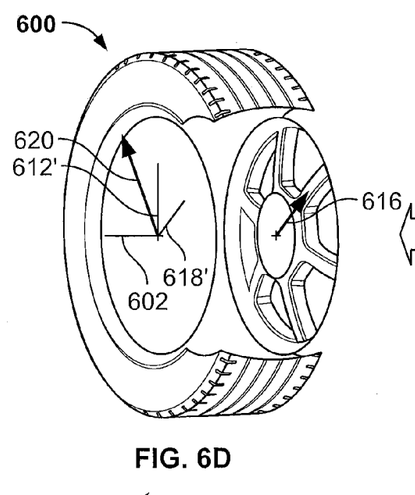
Figure 6E:
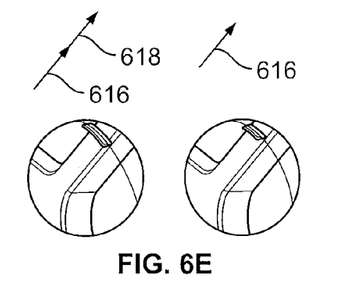
Figure 6F:
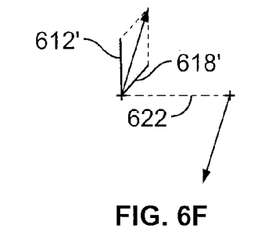

In some known cases of imbalance of a wheel assembly the computed weight amount corresponding to the selected wheel spoke would be physically wider in width than the spoke itself and thus not be hidden from view. FIGS. 6A through 6F are vector diagrams of a spoke wheel assembly 600 having an initial imbalance condition wherein the computed weight amount corresponding to the selected wheel spoke would be physically wider in width than the spoke itself and an exemplary solution. Spoke wheel assembly 600 includes an imbalance vector 602 on an inner plane 604 and a relatively large imbalance vector 606 on an outer plane 608. In the exemplary embodiment, outer plane 608 comprises a six spoke rim 610. A width of the spokes at a weight application point along rim 610 is determined and made known to a wheel balancer (not shown in FIG. 6). For example, the spoke width may be made known to a wheel balancer by determining the width by non-contact sensing, ultrasonic sensing, mechanical device inputs, data entry, and/or database look up. Imbalance vector 606 is resolved into a first spoke vector 612 and a second spoke vector 614 and the spoke which yields the smallest weights and smallest residual couple magnitude for a single spoke weight using the methods previously described is determined. In the exemplary embodiment, first spoke vector 612 is determined to be translated to inner plane 604 as vector 612'. A determination is then made to determine if the single spoke weight would be wider than the spoke using known correction weight geometry, amount of weight required, and the known spoke width at the point of weight application. If the weight determined is wider than the spoke, the vector magnitude at that spoke is reduced to result in a physical weight width which would be hidden behind the spoke. In the exemplary embodiment, it is determined that the weight corresponding to vector 614 would be wider than the associated spoke. Vector 614 is resolved into two vectors represented as vectors 616 and 618 having the same phase angle. The magnitude of vector 616 is selected such that the corresponding correction weight is narrower than the spoke. Vector 618 is translated to inner plane 604 as translated vector 618'. Vectors 602, 612' and 618' are combined to form a new final vector 620 on inner plane 604. FIG. 6E illustrates a physical weight width determined by the combination of vectors 616 and 618 that is wider than the spoke and a physical weight width that is narrower than the spoke that is associated with only vector 616. FIG. 6F illustrates a residual couple force 622 that is determined to be less than a predetermined acceptable couple force level. Inner and outer weights are then displayed to the operator corresponding to vectors 620 and 616, respectively, and the imbalance correction of spoke wheel assembly 600 is completed using only a single spoke weight.

In some imbalance situations it may be beneficial to translate a vector component from the inner plane to the outer plane rather than from the outer to the inner. FIGS. 7A through 7D are vector diagrams of a spoke wheel assembly 700 having an initial imbalance condition such that it is beneficial to translate a vector component from an inner plane 702 to the outer plane 704. In the exemplary embodiment, it is determined that a vector 706 is required on inner plane 702 and a vector 708 is required on outer plane 704 to correct the initial imbalance condition. In the exemplary embodiment, vector 706 can be translated to outer plane 704 as vector 706' resulting in a combined outer plane vector 712 which, substantially resides at a spoke. A predicted residual couple 714 (shown in FIG. 7D) is determined to be less than a predetermined acceptable couple force level. The imbalance correction of spoke wheel assembly 700 is thus completed using a weight at only one spoke and no weight on inner plane 702 at all. The determination of translating the vector from inner plane 702 to outer plane 704 is dependent on the width of the spoke and the initial arrangement of the imbalance in the wheel and therefore the translation may not be able to be implemented in every imbalance condition. In addition, positioning a weight at the exact center of a spoke is not required. For example if a determined weight is narrower than the width of the spoke, the weight can be positioned off the radial centerline of the spoke and the weight remains hidden from view.

Figure 7A:
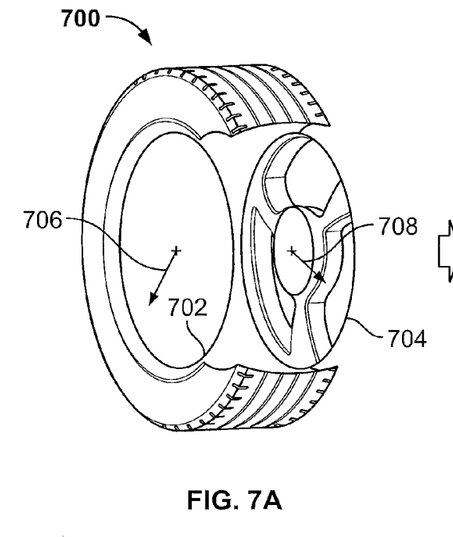
FIGS. 7A through 7D are vector diagrams of a spoke wheel assembly having an initial imbalance condition such that it is beneficial to translate a vector component from an inner plane to an outer plane.
Figure 7B:
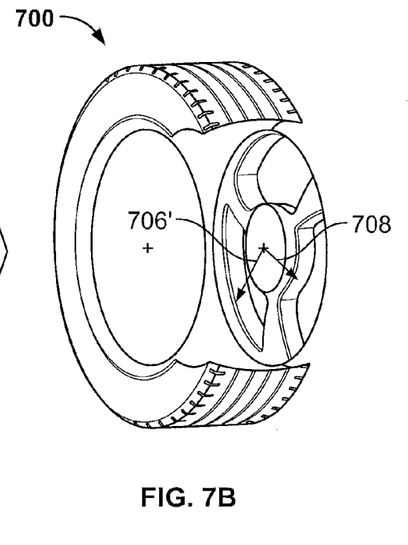
Figure 7C:
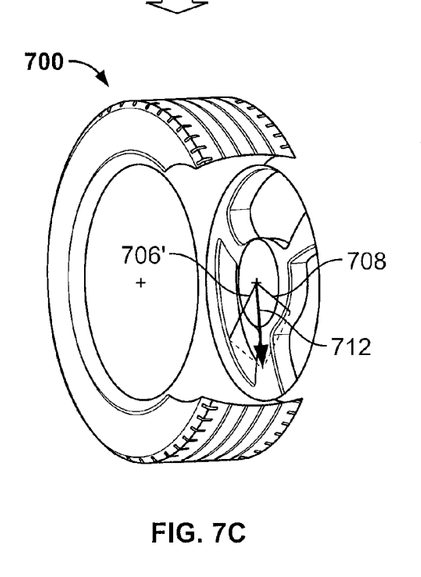
Figure 7D:
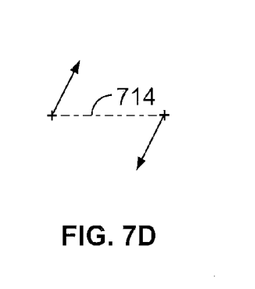
Figure 8A:
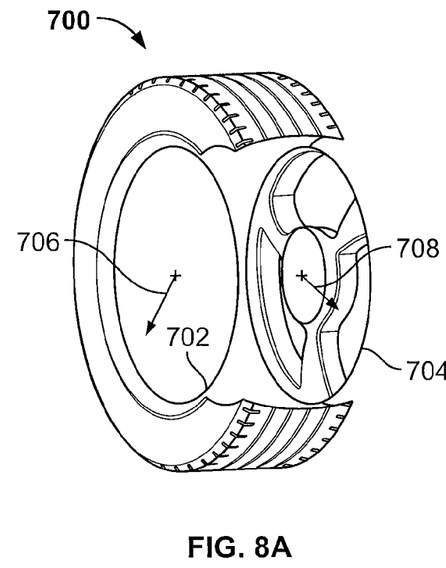
FIGS. 8A through 8D are vector diagrams of a spoke wheel assembly having an initial imbalance condition as shown in FIG. 7A and an alternate solution to achieve a single spoke weight.
Figure 8B:
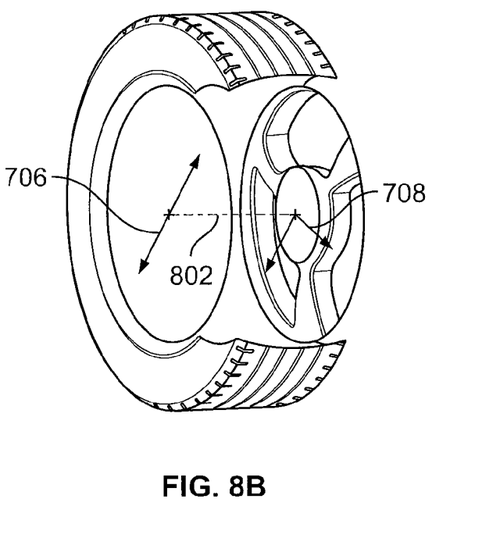
Figure 8C:
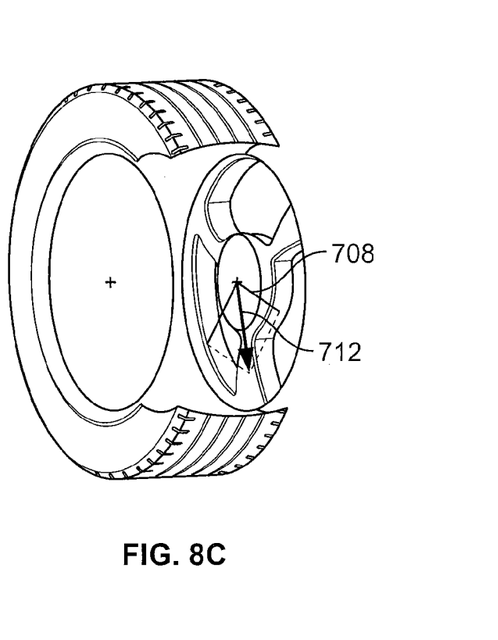
Figure 8D:
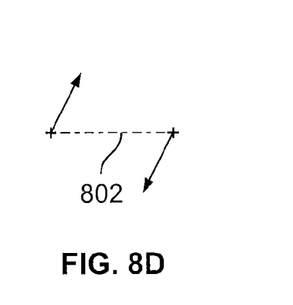
Figure 9A:
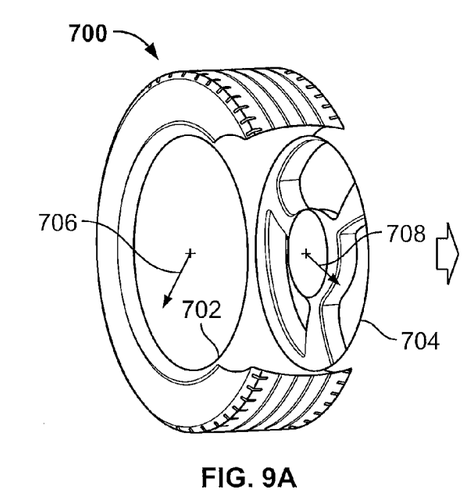
FIGS. 9A through 9E are vector diagrams of a spoke wheel assembly having an initial imbalance condition as shown in FIG. 7A and an another alternate solution to achieve a single spoke weight.
Figure 9B:
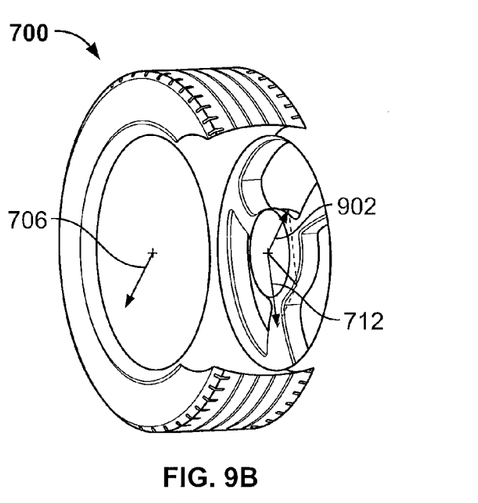
Figure 9C:
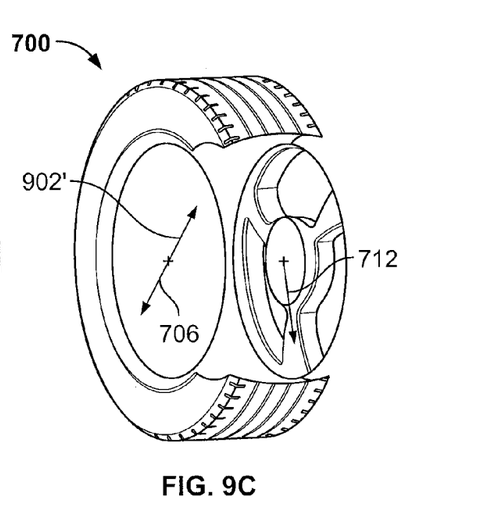
Figure 9D:
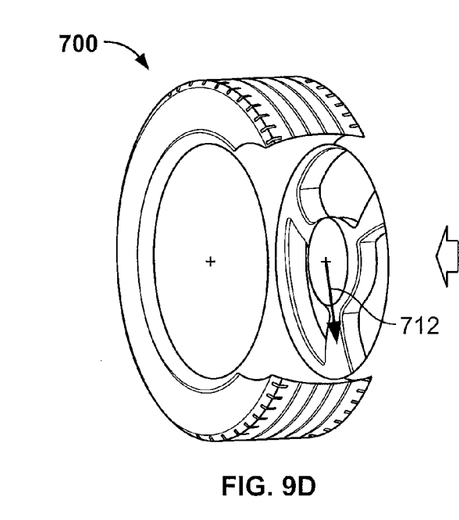
Figure 9E:
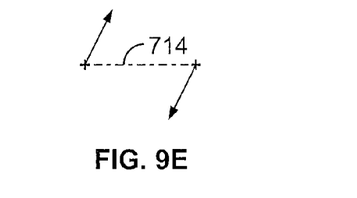

Alternate methods can be employed to achieve a single spoke weight without departing from the spirit of the invention. FIGS. 8A through 8D are vector diagrams of a spoke wheel assembly 700 having the initial imbalance condition as shown in FIG. 7A and an alternate solution to achieve a single spoke weight. In the exemplary embodiment, a couple imbalance is intentionally added during the computation as vector pair 802 shown in FIGS. 8B and 8D. Vectors are combined at inner plane 702 and outer plane 704 to yield the same final vector 712, as determined previously with respect to FIGS. 7A through 7D on outer plane 704, and no weight required on inner plane 702. It should be noted that under certain imbalance conditions outer (spoke) plane 704 could be the plane that requires no added weight, which represents an improved solution over traditional two-spoke or one-spoke methodologies. In an alternative embodiment, couple force vector pair 802 is added in the form of imbalance signals before weight plane correction vectors are computed. This method could also be applied in an iterative fashion which observes the effect of a resulting outer spoke plane vector change after each iteration, altering the magnitude and phase of the added couple force until the outer plane vector corresponds substantially to a spoke.

Yet another alternate embodiment applies the step of resolving the outer plane vector to result in two vectors, only one of which coincides with a spoke. FIGS. 9A through 9E are vector diagrams of a spoke wheel assembly 700 having the initial imbalance condition as shown in FIG. 7A and an another alternate solution to achieve a single spoke weight. A spoke is selected for the single weight and a vector 902 is determined that vectorally subtracts from outer plane vector 708 such that resultant vector 712 is positioned at that spoke. Vector 902 is then translated to inner plane 702 as vector 902' and combined with inner plane vector 706, yielding, in this case, no inner plane weight, the same final outer plane vector 712, and the same residual couple imbalance 714 (shown in FIG. 7d).

Figure 10:
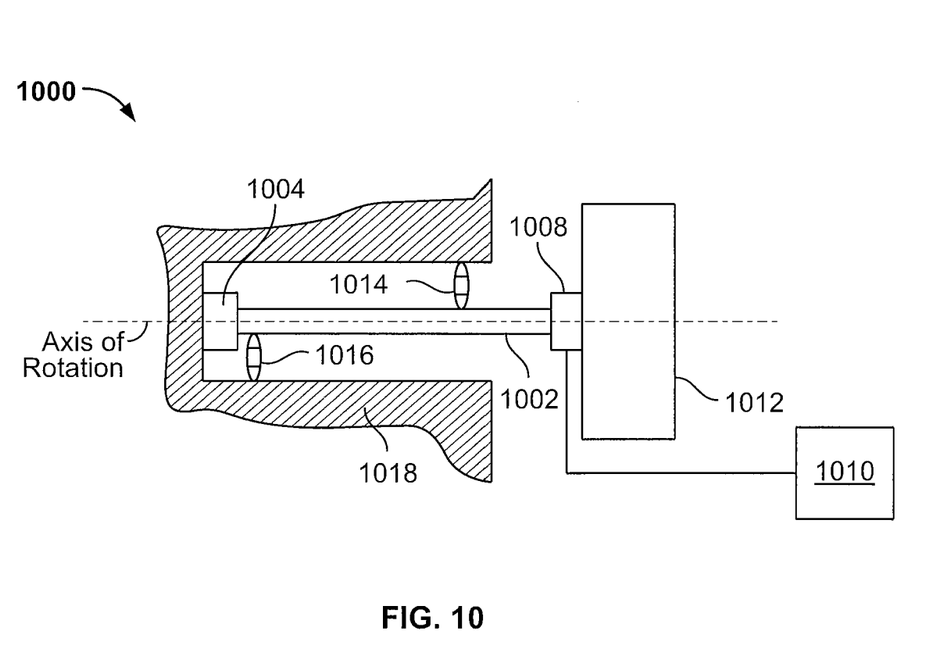
FIG. 10 is a perspective view of a vehicle wheel balancing system in accordance with an embodiment of the present invention.

FIG. 10 is a perspective view of a vehicle wheel balancing system 1000 in accordance with an embodiment of the present invention. Vehicle wheel balancing system 1000 as shown is illustrative only, as one of ordinary skill in the art in the balancer field will recognize that the particular devices and structures used to obtain dimensional and imbalance information related to a rotating body may be readily changed without changing the present invention.

Balancing system 1000 includes a rotatable shaft or spindle 1002 driven by a suitable drive mechanism such as a motor 1004 directly coupled to shaft 1002 as shown or coupled to shaft 1002 through a power transmission device such as a drive belt (not shown). Mounted on shaft 1002 is a conventional optical shaft encoder 1008 which provides speed and rotational position information to a central processing unit 1010.

During the operation of wheel balancing, at the end of the shaft 1002, a rotating body 1012 under test is removably mounted for rotation. Rotating body 1012 may comprise a wheel rim, or a wheel assembly comprising a wheel rim and a tire mounted thereon. To determine the rotating body imbalance, the balancer includes at least one imbalance force sensors 1014 and 1016, such as piezoelectric sensors or strain gauges, coupled to shaft 1002 and mounted on a balancing system base 1018.

When rotating body 1012 is unbalanced, it vibrates in a periodic manner as it is rotated, and these vibrations are transmitted to shaft 1002. Imbalance sensors 1014 and 1016 are responsive to these vibrations in shaft 1002, and generate a pair of electrical signals corresponding to the phase and magnitude of the vibrations at the particular sensor locations. These signals are input to central processing unit 1010, which determines forces acting on the rotating body due to the imbalance and determines the required magnitudes and positions of correction weights necessary to correct the imbalance.

For the described embodiments of the present invention, weights are rounded for display since weights are typically available only in discrete increments. The present invention applies rounding and even re-checks that residual imbalance forces due to applying the rounded weights meet predetermined limits, adjusting correction weight computations if necessary until the predicted residual imbalance condition is within a predetermined range. Weight rounding and other known "weight manipulation" techniques can also be optionally performed before, in conjunction with, or after the steps of the various embodiments of the present invention. Examples include but are not restricted to: weight curvature compensation and "static optimization" methods.

The above-described methods and systems for balancing automotive vehicle wheels with rims that are constructed with radially extending, spaced apart spokes are cost-effective and highly reliable. The methods include storing data pertaining to the wheel spokes, rotating the wheel to determine imbalance condition of the wheel, and determining the magnitude and direction of imbalance correction vectors required at an inner and outer imbalance correction planes by translating at least one imbalance vector component of one plane to the other plane such that only one spoke is needed for correction weight placement. The method facilitates balancing spoked wheels using only one spoke, in all conditions of imbalance, and possibly selecting a spoke other than the spoke nearest to the un-split imbalance angle in order to produce less residual imbalance and/or to enable using less total weight. The method also facilitates avoiding static imbalance residual error caused by placing weight behind only one spoke, and provides a reduced magnitude of the single spoke weight when the length of the weight would be wider than the spoke at the point that the weight is to be placed.

While the invention has been described in terms of various specific embodiments, those skilled in the art will recognize that the invention can be practiced with modification within the spirit and scope of the claims.

What is claimed is:

1. A method for reducing imbalance correction weight usage at radially extending, circumferentially spaced apart spokes of a wheel assembly, said method comprising:
   determining the static and couple imbalance of the wheel assembly;
   determining a first initial imbalance characteristic associated with a first correction weight placement plane, the first correction weight placement plane including a plurality of hidden weight placement zones behind the spokes;
   determining a second initial imbalance characteristic associated with a second correction weight placement plane laterally separated from the first correction weight placement plane;
   computing a correction weight for the first plane, utilizing both the first initial imbalance characteristic and the second initial imbalance characteristic;
      wherein the correction weight is to be applied to the wheel assembly in only one of the plurality of hidden weight placement zones in the first plane; and
   displaying the correction weight.

2. The method of claim 1, wherein computing the correction weight comprises transferring a portion of the first initial imbalance characteristic from the first correction weight placement plane to the second correction weight placement plane.

3. The method of claim 2, wherein computing the correction weight further comprises combining the transferred portion of the first initial imbalance characteristic with the second initial imbalance characteristic.

4. The method of claim 1, wherein computing the correction weight comprises transferring a portion of the second initial imbalance characteristic from the second correction weight placement plane to the first correction weight placement plane.

5. The method of claim 4, wherein computing the correction weight further comprises combining the transferred portion of the second initial imbalance characteristic with the first initial imbalance characteristic.

6. The method of claim 1, wherein computing the correction weight comprises:
   representing the first initial imbalance characteristic as at least one spoke vector; and
   transferring the at least one spoke vector from the first correction weight placement plane to the second correction weight placement plane.

7. The method of claim 1, wherein computing the correction weight comprises:
   representing the first initial imbalance characteristic as at least one spoke vector; and
   transferring a portion of the at least one spoke vector from the first correction weight placement plane to the second correction weight placement plane.

8. The method of claim 1, further comprising mathematically adding an additional couple imbalance to the determined couple imbalance.

9. The method of claim 8, wherein adding the additional couple imbalance occurs prior to computing the correction weight.

10. The method of claim 8, wherein computing the correction weight comprises iteratively altering at least one of the magnitude and the phase of the additional couple imbalance.

11. The method of claim 1, further comprising mathematically adding a pair of vectors corresponding to an additional couple imbalance to the first and second initial imbalance characteristics.

12. The method of claim 11, wherein computing the correction weight comprises iteratively altering at least one of the magnitude and the phase of the additional couple imbalance.

13. The method of claim 1, wherein the method is executed with a wheel balancing machine, the machine including a rotating assembly and at least one imbalance force sensor, the method further comprising:
   rotating the wheel assembly with the rotating assembly; and
   measuring the rotating imbalance forces of the wheel assembly with the at least one imbalance force sensor.

14. The method of claim 13, wherein the machine further includes a central processing unit, the processing unit computing the correction weight.

15. The method of claim 13, wherein the machine further includes a central processing unit, the processing unit determining the first initial imbalance characteristic and the second initial imbalance.

16. A wheel balancer system for a wheel assembly including radially extending, circumferentially spaced apart spokes, the system comprising:
   a rotatable wheel assembly mount;
   a plurality of imbalance sensors, said sensors configured to measure an imbalance characteristic associated with the wheel assembly; and
   a processor communicatively coupled to said sensors and configured to:
      determine the static and couple imbalance of the wheel assembly;
      determine a first initial imbalance characteristic associated with a first correction weight placement plane, the first correction weight placement plane including a plurality of hidden weight placement zones behind the spokes;
      determine a second initial imbalance characteristic associated with a second correction weight placement plane laterally separated from the first correction weight placement plane;
      compute a correction weight for the first plane utilizing both the first initial imbalance characteristic and the second initial imbalance characteristic;
         wherein the correction weight is to be applied to the wheel assembly in only one of the plurality of hidden weight placement zones in the first plane; and
      display the correction weight.

17. The wheel balancer system of claim 16, wherein the processor is further configured to transfer a portion of the first initial imbalance characteristic from the first correction weight placement plane to the second correction weight placement plane.

18. The wheel balancer system of claim 17, wherein the processor is further configured to combine the transferred portion of the first initial imbalance characteristic with the second initial imbalance characteristic.

19. The wheel balancer system of claim 16, wherein the processor is further configured to transfer a portion of the second initial imbalance characteristic from the second correction weight placement plane to the first correction weight placement plane.

20. The wheel balancer system of claim 19, wherein the processor is further configured to combine the transferred portion of the second initial imbalance characteristic with the first initial imbalance characteristic.

21. The wheel balancer system of claim 16, wherein the processor is further configured to:
represent the first initial imbalance characteristic as at least one spoke vector; and
transfer the at least one spoke vector from the first correction weight placement plane to the second correction weight placement plane.

22. The wheel balancer system of claim 16, wherein the processor is further configured to:
represent the first initial imbalance characteristic as at least one spoke vector; and
transfer a portion of the at least one spoke vector from the first correction weight placement plane to the second correction weight placement plane.

23. The wheel balancer system of claim 16, the processor further configured to mathematically add an additional couple imbalance to the determined couple imbalance.

24. The wheel balancer system of claim 23, the processor is configured to add the additional couple imbalance prior to computing the correction weight.

25. The wheel balancer system of claim 23, wherein the processor is configured to iteratively alter at least one of the magnitude and the phase of the additional couple imbalance.

26. The wheel balancer system of claim 16, the processor further configured to mathematically add a pair of vectors corresponding to an additional couple imbalance to the first initial imbalance characteristic and the second initial imbalance characteristic.

27. The wheel balancer system of claim 26, wherein the processor is configured to iteratively alter at least one of the magnitude and the phase of the additional couple imbalance.

28. A wheel balancer system comprising:
a rotatable wheel assembly mount;
a plurality of imbalance sensors, said sensors configured to measure a wheel assembly imbalance condition; and
a processor responsive to said imbalance sensors and configured to:
determine a first imbalance characteristic of the wheel assembly in a first correction weight placement plane including a plurality of hidden weight placement zones behind respective radially extending, circumferentially spaced apart spokes of the wheel assembly;
determine a second initial imbalance characteristic in a second correction weight placement plane laterally separated from the first correction weight placement plane; and
determine a correction weight to be applied to the wheel assembly in only one of the plurality of hidden weight placement zones in the first correction weight placement plane;
wherein the correction weight is derived from both the first initial imbalance characteristic and the second initial imbalance characteristic.

* * * * *